(12) United States Patent  
Emigh

(10) Patent No.: US 8,943,077 B1  
(45) Date of Patent: Jan. 27, 2015

(54) COMMUNITY-MODIFIED PROFILE WITH ACTIVITY-BASED AUTHORIZATION

(75) Inventor: Aaron T. Emigh, Incline Village, NV (US)

(73) Assignee: Vivint, Inc., Provo, UT (US)

( * ) Notice: Subject to any disclaimer, the term of this patent is extended or adjusted under 35 U.S.C. 154(b) by 69 days.

(21) Appl. No.: 13/539,382

(22) Filed: Jun. 30, 2012

Related U.S. Application Data

(63) Continuation of application No. 13/297,270, filed on Nov. 16, 2011, now Pat. No. 8,244,744, which is a continuation of application No. 12/833,982, filed on Jul. 11, 2010, now Pat. No. 8,065,312, which is a continuation of application No. 11/895,129, filed on Aug. 22, 2007, now Pat. No. 7,756,895.

(60) Provisional application No. 60/839,216, filed on Aug. 22, 2006.

(51) Int. Cl.  
 *G06F 17/30* (2006.01)

(52) U.S. Cl.  
 USPC .......................................................... 707/756

(58) Field of Classification Search  
 USPC ............................ 707/756, 784; 709/225, 229  
 See application file for complete search history.

(56) References Cited

U.S. PATENT DOCUMENTS

| | | | |
|---|---|---|---|
| 5,832,212 A * | 11/1998 | Cragun et al. ..................... 726/2 |
| 6,091,956 A | 7/2000 | Hollenberg | |
| 6,122,572 A | 9/2000 | Yavnai | |
| 6,177,905 B1 | 1/2001 | Welch et al. | |
| 6,198,431 B1 | 3/2001 | Gibson | |
| 6,266,612 B1 | 7/2001 | Dussell et al. | |
| 6,456,938 B1 | 9/2002 | Barnard | |
| 6,477,462 B1 | 11/2002 | Rychlak | |
| 6,484,033 B2 | 11/2002 | Murray | |
| 6,680,675 B1 | 1/2004 | Suzuki | |
| 6,778,905 B2 | 8/2004 | Horikami | |
| 6,819,256 B2 | 11/2004 | Hampton | |
| 6,834,195 B2 | 12/2004 | Brandenberg et al. | |
| 6,848,104 B1 | 1/2005 | Van Ee et al. | |
| 6,850,837 B2 | 2/2005 | Paulauskas et al. | |
| 6,944,539 B2 | 9/2005 | Yamada et al. | |
| 7,016,855 B2 | 3/2006 | Eaton et al. | |
| 7,039,420 B2 | 5/2006 | Koskinen et al. | |
| 7,069,238 B2 | 6/2006 | I'Anson et al. | |

(Continued)

OTHER PUBLICATIONS

Ellison et al., Spatially Bounded Online Social Networks and Social Capital: The Role of Facebook, Jun. 19-23, 2006, Google, pp. 37.*

(Continued)

*Primary Examiner* — Jean B Fleurantin  
(74) *Attorney, Agent, or Firm* — Holland & Hart LLP

(57) ABSTRACT

In some embodiments, techniques for modifying a profile may include associating a permissions level with a second user; responsive to detecting activity by the second user, increasing the permissions level; comparing the permissions level to a threshold; determining that the permissions level exceeds the threshold; responsive to determining that the permissions level exceeds the threshold, permitting the second user to modify a first profile data associated with profile associated with a first user; receiving a second profile data from the second user, wherein the second profile data is a result of a modification of the first profile data; associating the second profile data with the profile of the first user; and providing the profile of the first user to a third user, wherein the profile of the first user includes the second profile data.

19 Claims, 5 Drawing Sheets

(56) References Cited

U.S. PATENT DOCUMENTS

| | | | |
|---|---|---|---|
| 7,084,758 | B1 | 8/2006 | Cole |
| 7,221,937 | B2 | 5/2007 | Lau et al. |
| 7,233,792 | B2 | 6/2007 | Chang |
| 7,305,244 | B2 | 12/2007 | Blomqvist et al. |
| 7,330,112 | B1 | 2/2008 | Emigh et al. |
| 7,394,405 | B2 | 7/2008 | Godden |
| 7,469,827 | B2 | 12/2008 | Katragadda et al. |
| 7,541,940 | B2 | 6/2009 | Upton |
| 7,577,522 | B2 | 8/2009 | Rosenberg |
| 7,696,868 | B1 | 4/2010 | Emigh |
| 7,756,895 | B1 | 7/2010 | Emigh |
| 7,818,016 | B2 | 10/2010 | Ahn |
| 7,818,317 | B1 | 10/2010 | Emigh et al. |
| 7,821,386 | B1 | 10/2010 | Barrett et al. |
| 7,848,976 | B2 * | 12/2010 | Juarez et al. .................. 705/35 |
| 7,884,713 | B1 | 2/2011 | Emigh |
| 8,010,129 | B2 | 8/2011 | Borjesson |
| 8,060,405 | B1 * | 11/2011 | Lawrence ................. 705/14.54 |
| 8,065,312 | B1 | 11/2011 | Emigh |
| 8,068,024 | B1 | 11/2011 | Emigh |
| 8,090,780 | B2 | 1/2012 | Hjelmeland Almas et al. |
| 8,138,907 | B2 | 3/2012 | Barbeau et al. |
| 8,188,856 | B2 | 5/2012 | Singh et al. |
| 8,193,932 | B1 | 6/2012 | Emigh |
| 8,244,744 | B1 | 8/2012 | Emigh |
| 8,299,916 | B1 | 10/2012 | Emigh |
| 2002/0054130 | A1 | 5/2002 | Abbott et al. |
| 2002/0067308 | A1 | 6/2002 | Robertson |
| 2002/0086680 | A1 | 7/2002 | Hunzinger |
| 2002/0111172 | A1 | 8/2002 | DeWolf et al. |
| 2002/0133355 | A1 | 9/2002 | Ross et al. |
| 2002/0184496 | A1 * | 12/2002 | Mitchell et al. ............... 713/168 |
| 2003/0063072 | A1 | 4/2003 | Brandenberg et al. |
| 2003/0069940 | A1 | 4/2003 | Kavacheri et al. |
| 2003/0078811 | A1 * | 4/2003 | Cole et al. ........................ 705/3 |
| 2003/0137435 | A1 | 7/2003 | Haddad et al. |
| 2003/0224762 | A1 | 12/2003 | Lau et al. |
| 2004/0023666 | A1 | 2/2004 | Moon et al. |
| 2004/0032393 | A1 | 2/2004 | Brandenberg et al. |
| 2004/0039644 | A1 * | 2/2004 | Postrel ............................ 705/14 |
| 2004/0043775 | A1 | 3/2004 | Kennedy et al. |
| 2004/0088104 | A1 | 5/2004 | Izbicki et al. |
| 2004/0098464 | A1 | 5/2004 | Koch et al. |
| 2004/0147252 | A1 | 7/2004 | Strom |
| 2004/0176107 | A1 | 9/2004 | Chadha |
| 2004/0203847 | A1 | 10/2004 | Knauerhase et al. |
| 2004/0203852 | A1 | 10/2004 | Janakiraman |
| 2004/0207522 | A1 | 10/2004 | McGee et al. |
| 2004/0230685 | A1 | 11/2004 | Seligmann et al. |
| 2004/0248586 | A1 | 12/2004 | Patel et al. |
| 2004/0263530 | A1 * | 12/2004 | Sahuc et al. ................... 345/619 |
| 2004/0266398 | A1 | 12/2004 | Adamczyk et al. |
| 2005/0066044 | A1 | 3/2005 | Chaskar et al. |
| 2005/0101335 | A1 | 5/2005 | Kelly et al. |
| 2005/0221820 | A1 | 10/2005 | Ruetschi |
| 2005/0250552 | A1 * | 11/2005 | Eagle et al. .................... 455/567 |
| 2005/0258980 | A1 | 11/2005 | Conover |
| 2006/0009905 | A1 | 1/2006 | Soderberg et al. |
| 2006/0058948 | A1 | 3/2006 | Blass et al. |
| 2006/0061488 | A1 | 3/2006 | Dunton |
| 2006/0106780 | A1 * | 5/2006 | Dagan ............................... 707/3 |
| 2006/0164259 | A1 | 7/2006 | Winkler et al. |
| 2006/0190536 | A1 | 8/2006 | Strong et al. |
| 2007/0005363 | A1 | 1/2007 | Cucerzan et al. |
| 2007/0024440 | A1 | 2/2007 | Moran et al. |
| 2007/0027917 | A1 * | 2/2007 | Ariel et al. ................. 707/104.1 |
| 2007/0149214 | A1 | 6/2007 | Walsh et al. |
| 2007/0168511 | A1 * | 7/2007 | Brochu et al. ................ 709/225 |
| 2007/0220090 | A1 * | 9/2007 | Hall .............................. 709/204 |
| 2007/0244633 | A1 | 10/2007 | Phillips et al. |
| 2008/0007399 | A1 | 1/2008 | Hart |
| 2008/0032666 | A1 | 2/2008 | Hughes et al. |
| 2009/0222328 | A1 * | 9/2009 | Figueroa et al. ................ 705/10 |
| 2009/0254954 | A1 * | 10/2009 | Jeong ........................... 725/105 |

OTHER PUBLICATIONS

First Action Interview Pilot Program OA for U.S. Appl. No. 11/895,129, 4 pages.

Notice of Allowance for U.S. Appl. No. 11/895,129, 39 pages.

Andrews, Dorine, "Audience-specific online community design", Communications of the ACM archive, vol. 45, Issue 4 (Apr. 2002), p. 64-68. Retrieved from the Internet: <URL:http://portal.acm.orglft_ gateway .cfm?id=505275&type=pdf&coll=GU I DE&d l=GU I DE&CFI D=85329918&CFTOKEN=75834826>.

Hattori et al., "Socialware: multiagent systems for supporting network communities", Communications of the ACM, vol. 42, Issue 3 (Mar. 1999), p. 55-61. Retrieved from the Internet<URL: http:// portal.acm.org/ft_gateway.cfm?id=295701 &type=pdf&coll=GUI DE&dl=GUIDE,GUIDE&CFI D=85330624&CFTOKEN=171 09188>.

Office Action dated Nov. 24, 2010 for U.S. Appl. No. 12/833,982, 52 pages.

Office Action dated Sep. 30, 2009 for U.S. Appl. No. 11/895,152, 10 pages.

Office Action dated Oct. 13, 2010 for U.S. Appl. No. 12/688,910, 8 pages.

Office Action dated Jul. 19, 2011 for U.S. Appl. No. 13/021,789, 8 pages.

Office Action dated Dec. 29, 2011 for U.S. Appl. No. 13/270,203, 8 pages.

Notice of Allowance dated Sep. 26, 2012 for U.S. Appl. No. 13/477,078, 13 pages.

Kanth et al, "Personalization and Location-based Technologies for E-Commerce Applications." Electronic Journal for Emerging Tools and Applications, issue 1, Jan. 2002.

Office Action dated Nov. 22, 2010 for U.S. Appl. No. 11/895,151, 9 pages.

Office Action dated Jun. 7, 2011 for U.S. Appl. No. 11/895,151, 9 pages.

Notice of Allowance dated Dec. 7, 2011 for U.S. Appl. No. 11/895,151, 10 pages.

Office Action dated Mar. 28, 2012 for U.S. Appl. No. 13/350,824, 11 pages.

Notice of Allowance for U.S. Appl. No. 13/297,270, 23 pages.

Notice of Allowance dated Nov. 29, 2013 for U.S. Appl. No. 13/662,567, 30 pages.

* cited by examiner

COMMUNITY-MODIFIED PROFILE WITH ACTIVITY-BASED AUTHORIZATION

CROSS REFERENCE TO RELATED APPLICATIONS

This application is a continuation of U.S. patent application Ser. No. 13/297,270, entitled COMMUNITY-MODIFIED PROFILE WITH CONNECTION-BASED AUTHORIZATION, filed Nov. 16, 2011 now U.S. Pat. No. 8,244,744, which is incorporated herein by reference for all purposes, which is a continuation of U.S. patent application Ser. No. 12/833,982, entitled COMMUNITY-MODIFIED USER DATA WITH ACCOUNTABILITY, filed Jul. 11, 2010, now U.S. Pat. No. 8,065,312, which is incorporated herein by reference for all purposes, which is a continuation of U.S. patent application Ser. No. 11/895,129, entitled COMMUNITY-MODIFIED USER DATA, filed Aug. 22, 2007, now U.S. Pat. No. 7,756,895, which is incorporated herein by reference for all purposes, which claims priority to U.S. Provisional Patent Application No. 60/839,216, entitled INFORMATION PROCESSING, filed Aug. 22, 2006, which is incorporated herein by reference for all purposes.

FIELD OF THE INVENTION

The present invention relates generally to the area of online services. More specifically, techniques for community-contributed modification of user-related data associated with an online service are disclosed.

BACKGROUND OF THE INVENTION

Online services with a strong social component have grown exponentially in the last several years. Sites such as MySpace and Facebook have garnered tens of millions of users. Many online services include user profiles, in which various information relating to a user can be displayed, such as friends, music, videos, comments, etc.

Many sites allow a user a degree of control over such data, such as selecting how to order friends, or what music or video is played when a profile page is viewed. Some sites also provide for community modifications to a particular constrained portion of a page, such as an area to leave comments about or endorsements of the user. However, current online services do not allow for community editing of profile data relating to the user associated with the profile, such as the ordering of friends, "what I like," favorite bands, interests, physical appearance, characteristic music, videos, etc.

Community-edited content sites such as Wikipedia and other wikis offer members of a community the ability to alter content relating to a wide variety of topics. However, such community editing is generally applied toward knowledge management and does not apply to user-related data such as profile data.

Unfettered modifications by a community of user-related data could lead to problems such as digital vandalism or inappropriate content. Community-edited sites have suffered widely from such problems and have instituted various reputation systems, with mixed results. In the case of user-related data, there is an opportunity to avoid such problems by allowing modification of such data only by those users who have demonstrated themselves to be positive participants in the community based on their previous activities, by allowing a user control over the availability and extent of such editing, and by using friend relationships and other data to ascertain permission. However, current online services do not provide this control for user-related data.

Accordingly, it would be useful to enable community-based editing of user-related data, and it would be further useful to predicate the availability and/or extent of such editing on the prior actions of would-be editors.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
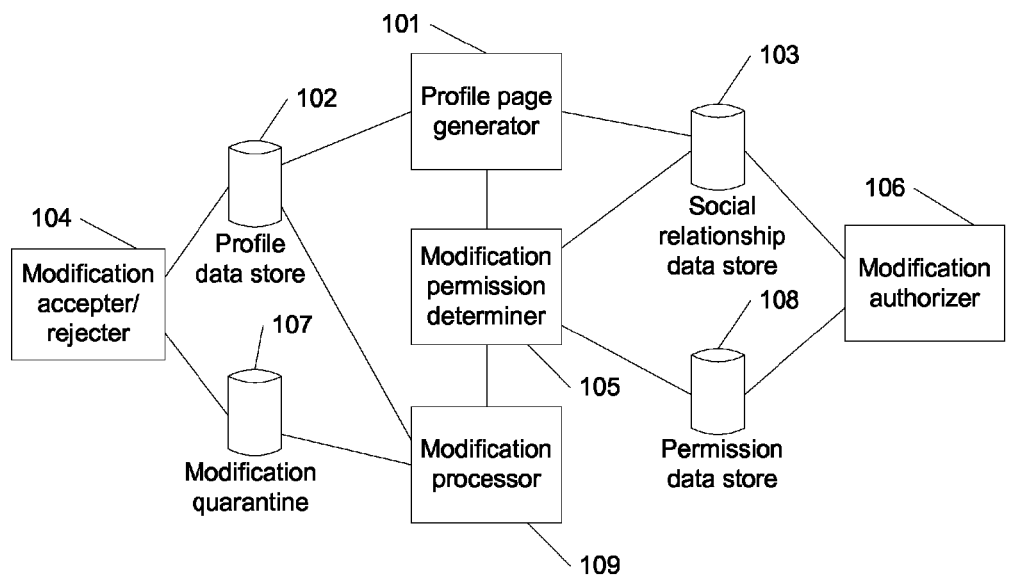
FIG. 1 is a diagram of a system for social profile modification, according to some embodiments.

FIG. 1 is a diagram of a system for social profile modification, according to some embodiments. In this example, a profile page generator 101 may generate a profile page based on data associated with a profile data store 102. A profile page refers herein to a page (such as a page on a web site, which may for example be provided at HTML or XHTML, or syndicated via RSS or Atom) the primary function of which is to describe a user of a service such as an online social networking service, and which is under the primary control of the user so described. In some embodiments, a profile page may be topically structured, including topics such as a user's interests, likes and dislikes, physical appearance, home town, current mood, current location, current activity, biography, photos, blog, top friends, favorite places, etc. In some embodiments, a profile page may have a distinctive color scheme and/or theme music, and/or places for unstructured content such as one or more widgets or videos. A user may enter some or all profile information relating to himself or herself.

A profile page generator 101 may retrieve various data from profile data store 102, assemble it into a renderable page, and provide it, for example in response to an HTTP request. In some embodiments, a rendered page may be retrieved. In some embodiments, elements of data may be retrieved and integrated together, for example using a template which in some embodiments may include stylistic information such as a color scheme and/or layout. The use of such templates is well known to those skilled in the art.

A profile page generator 101 may retrieve data from a social relationship data store 103, which may for example provide data about one or more connections such as friend connections relating to a user whose profile page has been requested. Such data may be included in a renderable profile page. Information relating to modification permissions of one or more customizable data elements may be received from modification permission determiner 105, and modifiable data element(s) may be indicated in the assembly of the page.

A profile data store 102 may store data relating to profiles, such as text, references to objects that may appear in a profile, and metadata. Examples of a profile data store 102 include one or more files on a filesystem, one or more databases such as relational databases, one or more tables associated with which may in some embodiments use a user identifier as a key, and a combination of filesystem(s) and database(s), for example in which data in a database maps user identifiers to user-specific data stored in a filesystem. In some embodiments, a profile data store 102 may be or include an in-memory data structure such as an array, list, binary tree, or hash table. In some embodiments, such an in-memory data structure may be read from and written to persistent storage such as one or more databases and/or files.

A social relationship data store 103 may store data relating to social connections between and among users. Examples of a social relationship data store 103 include one or more files on a filesystem, one or more databases such as relational databases, one or more tables associated with which may in some embodiments use a user identifier as a key and provide one or more contacts (for example one per row) and optionally associated connection type(s) in response to a query, and a combination of filesystem(s) and database(s), for example in which data in a database maps user identifiers to user-specific connection data stored in a filesystem. In some embodiments, a social relationship data store 103 may be or include an in-memory data structure such as an array, list, binary tree, or hash table. In some embodiments, such an in-memory data structure may be read from and written to persistent storage such as one or more databases and/or files.

Modification permission determiner 105 may provide information relating to modification permissions of one or more customizable data elements to profile page generator 101 and/or modification processor 109. Modification permission determiner 105 may determine permissions for user A to modify profile data belonging to user B, for example by retrieving and processing one or more permissions relating to user B's profile or element(s) thereof from permission data store 108. In some embodiments, modification permission determiner 105 may retrieve social relationships from social relationship data store 103, for example if a modification is permitted by user B conditionally based on the existence of a connection status between user A and user B, such as a friend relationship.

Modification processor 109 may receive a request to perform a modification to a user's profile data, for example via an HTTP request. Modification processor 109 may check permissions for a requesting user to modify the requested data element(s) via modification permission determiner 105. Based on permissions, one or more requested modifications may be made to profile data store 102 and/or modification quarantine 107.

Modification quarantine 107 may contain modifications that have been made to profiles which require approval from a profile owner or other authorized party to take effect. Examples of a modification quarantine 107 include one or more files on a filesystem, one or more databases such as relational databases, one or more tables associated with which may in some embodiments use a user identifier as a key and provide one or more quarantined profile modifications (for example one per row), and a combination of filesystem(s) and database(s), for example in which data in a database maps user identifiers to user-specific connection data stored in a filesystem. In some embodiments, a modification quarantine 107 may be or include an in-memory data structure such as an array, list, binary tree, or hash table. In some embodiments, such an in-memory data structure may be read from and written to persistent storage such as one or more databases and/or files.

Modification acceptor/rejecter 104 may provide a user interface (for example via HTTP in response to an HTTP request, and/or using Javascript) that enables a profile owner, or in some embodiments another authorized modifier, to review quarantined modifications in modification quarantine 107. If a user elects to accept a quarantined modification, then in this example it is applied to data in profile data store 102 and removed from modification quarantine 107. If a user elects to reject a quarantined modification, then in this example it is removed from modification quarantine 107.

Permission data store 108 may contain permission data relating to who is authorized to modify profile data and/or specific element(s) of profile data. Examples of parties and/or classes thereof for whom permissions may be stored in permission data store, indicating permission to modify (or not modify) part or all of a profile, include a friend of a profile owner, a user explicitly authorized by a profile owner, a user who has had his modification permissions elevated by accumulation of karma, for example by a high or meritorious level of usage of the social network service, and a user who has purchased the permission to modify a profile. In some embodiments, a combination of criteria may be required for a user to be permitted to modify profile data, for example explicit identification by the profile owner combined with payment or an accumulation of karma.

Examples of a permission data store 108 include one or more files on a filesystem, one or more databases such as relational databases, one or more tables associated with which may in some embodiments use a user identifier corresponding to a profile owner and/or a profile element as a key and provide one or more permission-related data, and a combination of filesystem(s) and database(s), for example in which data in a database maps user identifiers to user-specific permission-related data stored in a filesystem. In some embodiments, a permission data store 108 may be or include an in-memory data structure such as an array, list, binary tree, or hash table. In some embodiments, such an in-memory data structure may be read from and written to persistent storage such as one or more databases and/or files.

A modification authorizer 106 may provide a user interface to a profile owner, allowing review and/or modification of permissions such as those discussed in conjunction with permission data store 108. In some embodiments, a modification authorizer 106 may include the capability to view and edit permissions filtered by element, by permission level (for example by defining roles and allowing mapping of users to roles with respect to the profile owner's profile data), and/or by user.

Further details of the operation of the system of this FIG. 1 are discussed in conjunction with the remaining Figures.

Figure 2:
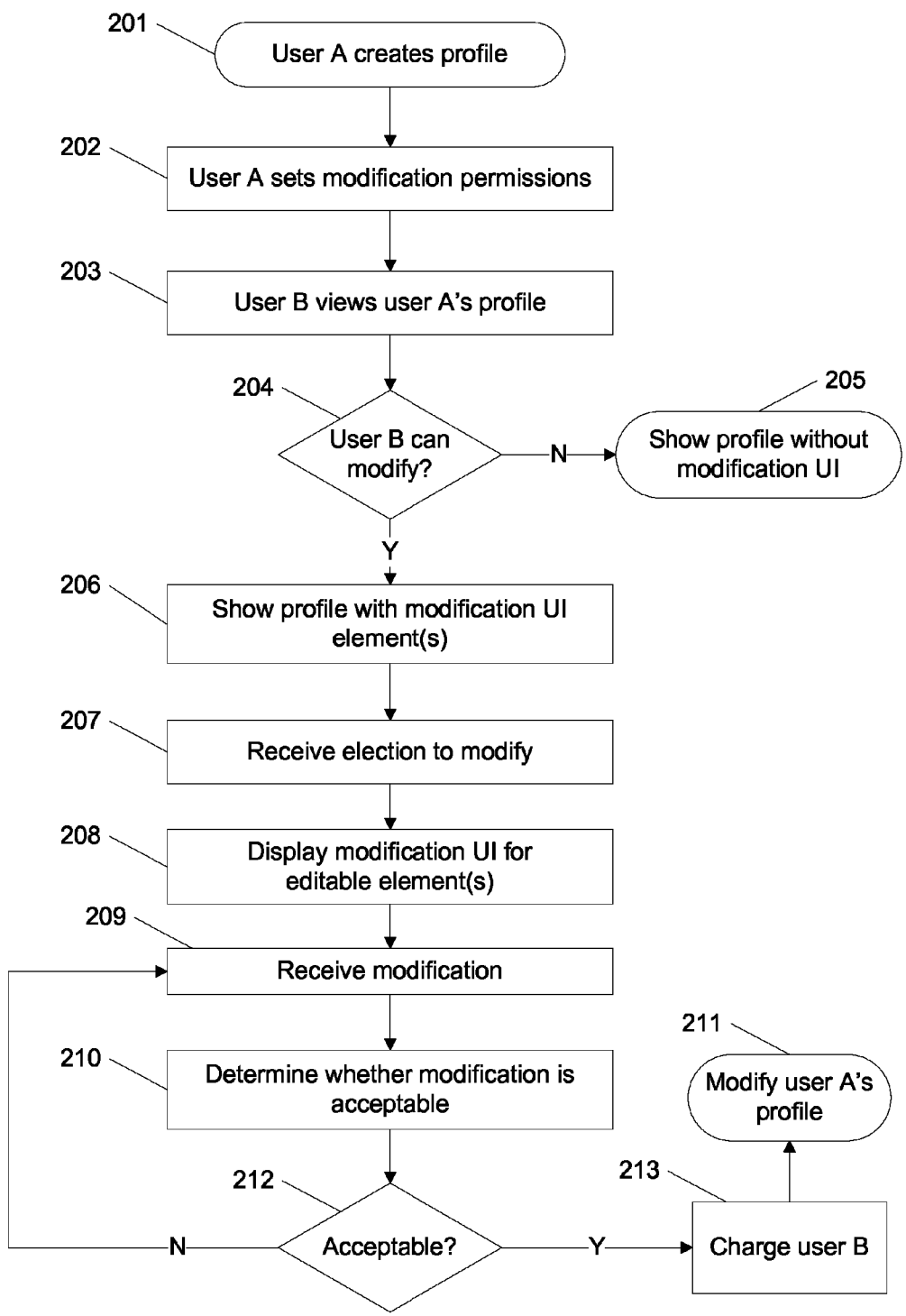
FIG. 2 is a flow diagram of a method for modifying a profile, according to some embodiments.

FIG. 2 is a flow diagram of a method for modifying a profile, according to some embodiments. In this example, user A creates a profile (201). An example of creating a profile is to register with a social networking service and enter data. In some embodiments, such data may subsequently be edited. "User A" refers herein to any user differentiated from "user B," and vice-versa.

User A may set modification permissions (202). In some embodiments, modification permissions may be coarse-grained, such as allowing modifications by everyone or by friends, or disallowing any modifications. In some embodiments, modification permissions may be fine-grained, such as permission regarding a particular element of profile data such as the ability to edit "top N friends" or a video or audio element. In some embodiments, a permission may apply to a user that is a friend (e.g. is connected via a friendship relationship on a social network) of the profile owner. An example of a friend is a person identified as a friend by the profile owner, for example by proactively or reactively asserting a friend relationship. In some embodiments, a permission may apply to a user explicitly authorized to make a profile modification, for example any profile modification or a profile modification of a particular element. In some embodiments, a permission may apply to a user who has had his modification privileges elevated by accumulation of karma, for example by a high or meritorious level of usage of the social network service. In some embodiments, a permission may apply to a user who has purchased the right to modify a profile. In some embodiments, a permission may apply to a role to which users may be assigned. In some embodiments, a permission may apply to user(s) based on a combination of criteria, for example explicit identification by the profile owner combined with payment or an accumulation of karma.

In some embodiments, a specification of acceptable modification(s) may be received as part of permissions setting. For example, modification options may be restricted to explicitly specified content, or restricted by an aspect of the content such as a performer (e.g. a band), a genre, and/or content certified or classified in some manner (for example excluding undesired or inappropriate content such as pornographic content).

User B may view a profile page owned by (e.g. associated with the identity of) user A (203). Such a view may result in a page request such as an HTTP request being received at a social networking service.

It may be determined whether user B has permission to modify user A's profile (204). Such determination may be made by looking up user B's permissions and/or permissions associated with user A's profile data, for example as discussed in conjunction with modification permission determiner 105 of FIG. 1.

If it is determined that user B does not have permission to modify user A's profile (204), then in this example the profile page is provided without user interface element(s) enabling modification of the profile (205). An example of providing a profile page is to provide it in response to an HTTP request, for example as HTML data.

If it is determined that user B has permission to modify user A's profile (204), then in this example the profile page is provided with one or more user interface elements enabling modification of the profile (206). In some embodiments, such a user interface element may permit dynamic editing, for example via Javascript and XmlHttpRequest. In some embodiments, such a user interface element may link to another page where a modification may be made.

An election to modify an element of the profile page may be received (207), for example a selection of a link indicating that user B wishes to perform a modification.

A modification user interface may be presented for one or more elements that user B has permission to modify (208). In some embodiments, such a user interface may be presented by providing a web page. In some embodiments, such a user interface may be presented by manipulating a document object model, for example via Javascript. In some embodiments, such a user interface may be present unconditionally for an element that user B has permission to modify. In some embodiments, a modification user interface may be specific to a selected element of page data. In some embodiments, a modification user interface may be provided for all relevant elements of page data that user B has permission to modify.

A modification may be received (209), for example via HTTP. An example of receiving a modification is to receive data containing the modification, for example as a form submission. Another example of receiving a modification is to receive data from a script such as a Javascript script, for example via an XmlHttpRequest. Another example of receiving a modification is to receive it via an API; in such embodiments, 203, 204, 205 and 206 may be omitted.

Examples of a modification include text describing the subject of a profile, one or more images, music that is to be played when a profile is loaded, one or more videos that can be played when a profile is loaded, and list of top friends such as a "top N" friends list.

It may be determined whether the modification is acceptable (210). Settings for acceptable modifications may be global and/or or specific to a profile page. For example, a modification may be restricted to explicitly specified content, or restricted by an aspect of the content such as a performer (e.g. a band), a genre, and/or content certified or classified in some manner (for example excluding inappropriate content such as pornographic content).

Figure 3:
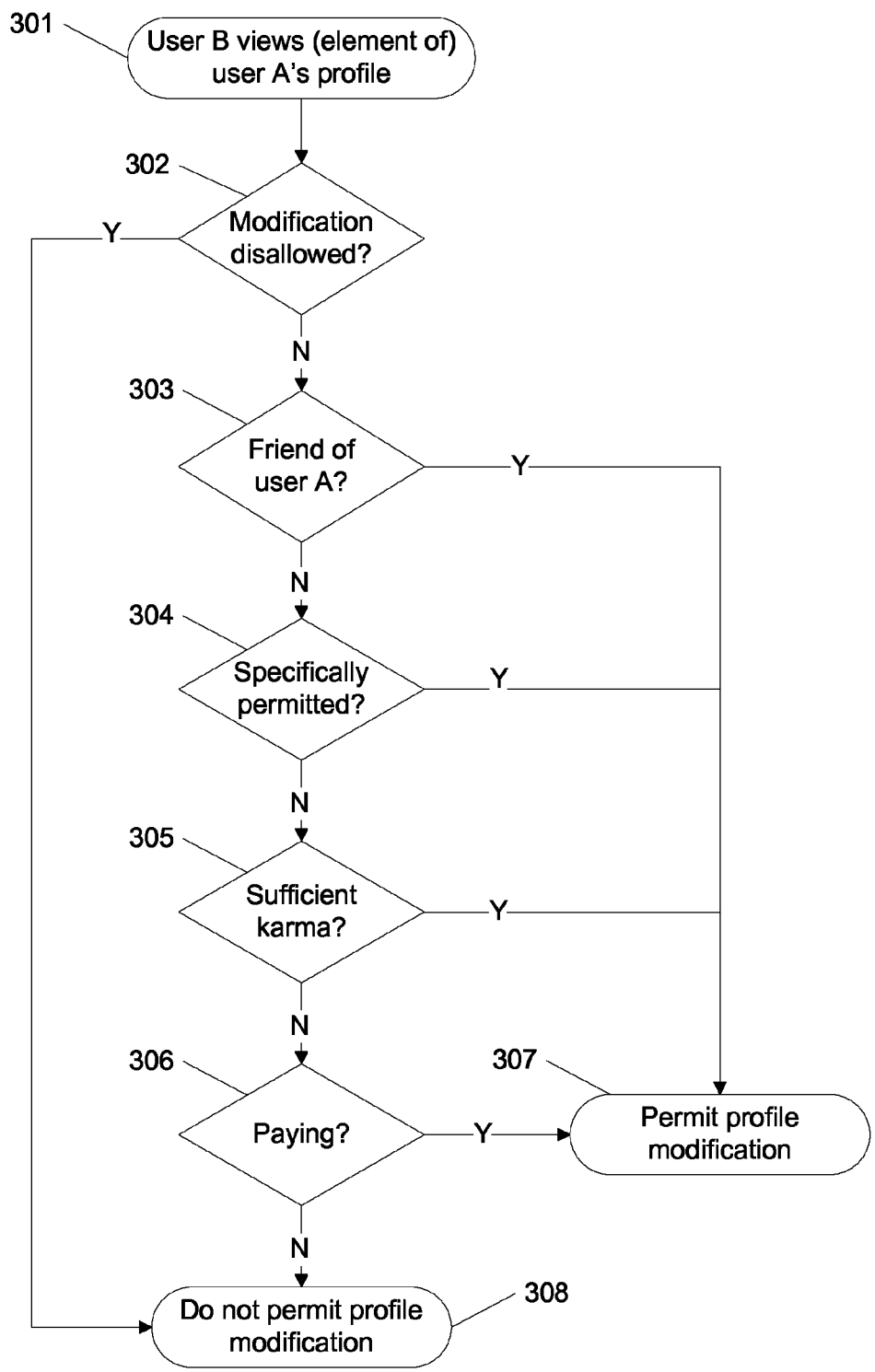
FIG. 3 is a flow diagram of a method for processing profile modification permissions, according to some embodiments.

In some embodiments, determining whether a modification is acceptable may include confirming that user B has permission to modify relevant element(s) of user A's profile, for example as discussed in conjunction with FIG. 3.

If it is determined that the modification is not acceptable (212), then in this example the modification is rejected, and an opportunity to alter the proposed modification, or provide an alternate modification, may be provided (209). In some embodiments, an option to cancel modification may be provided.

If it is determined that the modification is acceptable (212), then in this example user B may be charged, in some embodiments (213). An example of charging user B is to debit an account associated with user B. Another example of charging user B is to deduct from a non-monetary balance, such as a karma level or a points-based scoring system.

The modification may be applied to user A's profile (211). An example of applying a modification to a profile is to alter profile data associated with the profile owner. In some embodiments, such a modification may include a record of the change made and/or the user making the change (e.g. in this example, user B). In some embodiments, for example in situations in which user B does not have an unrestricted right to modify user A's profile, or when user A (or a global setting) has required review of modifications, the modification to profile data may be quarantined. Quarantining a modification refers herein to storing the modification in a manner in which it is reviewable and subject to approval or rejection by an authorized party such as the owner of a profile to which the modification applies, but may not have an effect on viewing a page to which it applies for a general viewer. As an example of such storage, the modification may be stored in a modification quarantine 107 of FIG. 1.

In some embodiments, a modification may be applied to persist indefinitely. In some embodiments, a modification may be applied to persist for a limited period of time, for example a predetermined period of time or a period of time associated with a user making the modification (e.g. user B), such as a period of time associated with karma the user has accumulated or a payment the user has made.

FIG. 3 is a flow diagram of a method for processing profile modification permissions, according to some embodiments. The technique of this FIG. 3 may be used to determine how to display a profile to a visiting user, for example as discussed in conjunction with 204, 205 and 206 of FIG. 2.

In the example of this FIG. 3, user B may view a profile page owned by (e.g. associated with the identity of) user A, or an element thereof (301). Such a view may result in a page request such as an HTTP request being received at a social networking service.

Permission data associated with user A's profile may be retrieved, and it may be determined whether modification is disallowed (302). If it is determined that modification is disallowed (302), then in this example profile modification is not permitted (308). An example of not permitting profile modification is to not display a modification user interface element. Another example of not permitting profile modification is to reject a requested modification.

If it is not determined that modification is disallowed (302), then in this example it is determined whether a friend connection exists that specifies that user B is a friend of user A (303). If it is determined that such a friend relationship exists, and that user A's profile is modifiable by his or her friends, then in this example profile modification is permitted (307). An example of permitting profile modification is to display a modification user interface element. Another example of permitting profile modification is to apply a requested modification.

If it is not determined that user B is a friend of user A (303), or if permissions associated with user A's profile do not necessarily permit modification by a friend, then in this example it is determined whether user B is specifically permitted to modify user A's profile (304). If it is determined that user B is specifically permitted to modify user A's profile (304), then in this example modification is permitted (307).

If it is not determined that user B is specifically permitted to modify user A's profile (304), then in this example it is determined whether user B has sufficient karma to modify user A's profile (305). An example of determining whether a karma level associated with a user is sufficient to permit a modification is to compare a numeric karma level with a threshold, which in various embodiments may be a global threshold or a threshold specified by an owner of data to which a modification is being considered (e.g. user A).

If it is determined that user B has sufficient karma to permit modification (305), then in this example profile modification is permitted (307). In some embodiments, a deduction may be made from user B's karma level.

If it is not determined that user B has sufficient karma to permit modification (305), then in this example it is determined whether user B is associated with a paying account (306). If it is determined that user B is associated with a paying account, and that the account is in good standing for the modification (e.g. by having a balance over a threshold, or by being fully paid up), then in this example profile modification is permitted (307).

If it is determined that user B is not associated with a paying account, or that user B's account is not in good standing for the modification (306), then in this example profile modification is not permitted (308).

Figure 4:
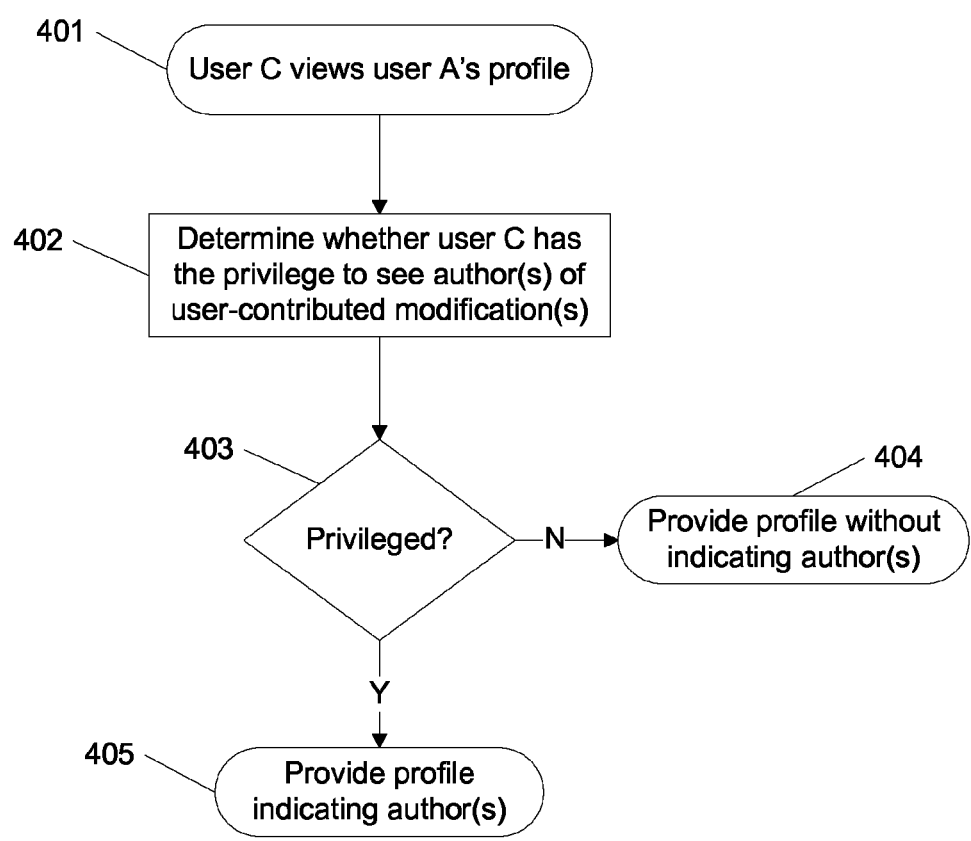
FIG. 4 is a flow diagram of a method for displaying a modification to a profile, according to some embodiments.

FIG. 4 is a flow diagram of a method for displaying a modification to a profile, according to some embodiments. In this example, user C may view a profile page owned by (e.g. associated with the identity of) user A (401). Such a view may result in a page request such as an HTTP request being received at a social networking service. "User C" refers herein to any user.

It may be determined whether user C has a privilege to see one or more authors of user-contributed modifications to the profile (402). One example of a privileged user is a user associated with the modified profile page (e.g. user A). Another example of a privileged user is a user who is a friend of the user who is associated with the modified profile page (e.g. a friend of user A). Another example of a privileged user is the user who performed the modification (e.g. user B of FIG. 2). Another example of a privileged user is a user who is a friend of the user who has performed the modification (e.g. a friend of user B of FIG. 2). Another example of a privileged user is a user with elevated privileges, for example an administrative user or a user who has been granted such permissions, for example by a high or meritorious level of usage of the social network service.

If it determined that user C does not have the privilege to see modification(s) (403), then in this example the profile page is provided without an indication of modification(s) and/or their associated author(s) (404). For example, the profile page may be provided with modifications invisible, or with an indication that a modification was made but without an indication of the author of the modification. In some embodiments, for example in embodiments in which friends of a modifier may see modifications made by the modifier, a profile page may be provided with some modifications visible and/or authorially indicated, and others may not, on the basis of a per-modification determination of privilege.

If it is determined that user C has the privilege to see modification(s) (403), then in this example the profile page is provided with an indication of modification(s) and/or their associated author(s) (405). For example, the profile page may be provided with an indication of where modification(s) were made, and in some embodiments an indication of the author (s) of such modification(s). In some embodiments, for example in embodiments in which friends of a modifier may see modifications made by the modifier, a profile page may be provided with some modifications visible and/or authorially indicated, and others may not, on the basis of a per-modification determination of privilege.

Figure 5:
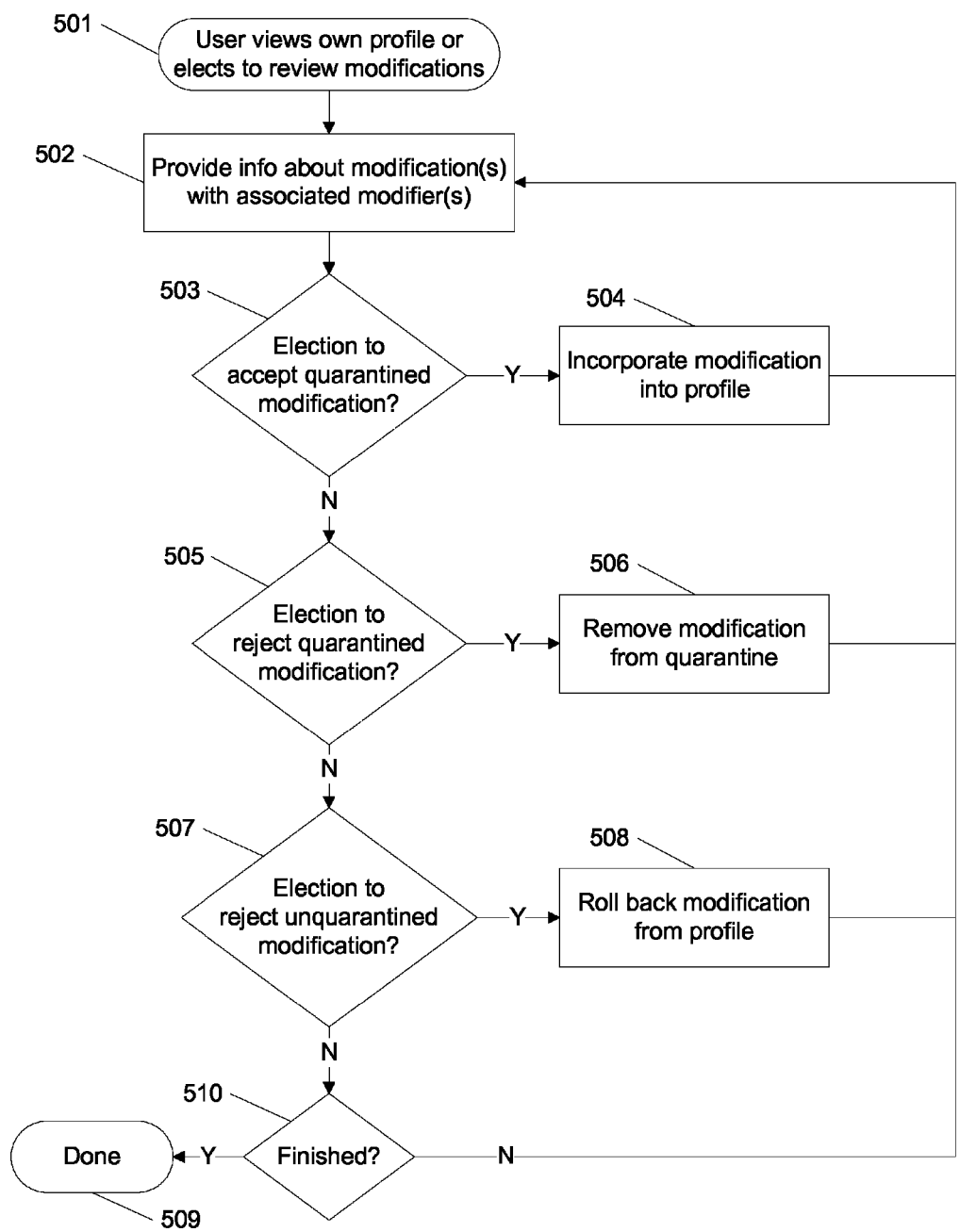
FIG. 5 is a flow diagram of a method for reviewing modifications to a profile, according to some embodiments.

FIG. 5 is a flow diagram of a method for reviewing modifications to a profile, according to some embodiments. In this example, a user views his or her own profile (e.g. a request is received from a user to view that user's profile), or elects to review one or more modifications associated with his or her profile (501).

Information relating to one or more modifications may be provided, in some embodiments with associated modification author(s) (502). One example of providing a modification is to provide it in context in a profile page data such as HTML or XHTML data, for example visually indicated as a modification, for example by color coding or by specifying a visual boundary such as a box around a modified element, and/or with an icon or textual link indicating a modification has occurred; in some embodiments, additional details such as a time and/or author of a modification, either initially or in response to a user action such as a mouseover. Another example of providing a modification is to provide a summary of the modification in a list of modifications. Such a list may be ordered or grouped in various ways, such as by date, by modifier, or by modified element. In some embodiments, a query may be received and modifications conforming to the query (which may for example specify a modifier, a modifier role, a textual element, a time range, and/or an element) may be provided. In some embodiments, a summary may contain details of a modification such as a time, modifier, and optionally a representation of a change, such as an output of "diff." In some embodiments, providing modification(s) may include transmitting HTML or XHTML data.

An election of an action may be received, for example by receiving an indication of a user selection of a user interface element such as a button associated with election of an action. It may be determined whether the action is to accept one or more quarantined modifications (503). If is determined that the election is to accept quarantined modification(s), then in this example one or more relevant modifications (such as specifically selected modification(s), or all modifications) are incorporated into the profile (504). An example of incorporating a modification into a profile is to alter profile data associated with the profile in accordance with the modification, and remove the modification from the quarantine, for example as discussed in conjunction with 506. Remaining modifications, if any, may be provided (502).

If it is not determined that the election is to accept a quarantined modification (503), then in this example it is determined whether the election is to reject a quarantined modification (505). If it is determined that the election is to reject a quarantined modification (505), then in this example one or more relevant modifications (such as specifically selected modification(s), or all modifications) are removed from quarantine (506). An example of removing a modification from quarantine is to remove information relating to the modification from a modification quarantine 107 of FIG. 1. Remaining modifications, if any, may be provided (502).

If it is not determined that the election is to reject a quarantined modification (505), then in this example it may be determined whether the election is to reject an unquarantined modification, e.g. a modification that has already been applied to the profile (507). If it is determined that the election is to reject an unquarantined modification (507), then in this example the modification is rolled back from the profile (508). An example of rolling back a modification from the profile is to retrieve a record relating to the modification, which includes a version of the data prior to the modification or a way to derive such data, and substituting the data. In some embodiments, a rollback may include successive rollbacks in reverse chronological order of any relevant modifications (for example, all modifications affecting a data element) through the modification being rolled back, followed (optionally) by reapplication in chronological order of modifications that are not being rolled back. These examples are illustrative and other applicable techniques for rolling back changes are known to those skilled in the art. Remaining modifications, if any, may be provided (502).

If it is not determined that the election is to reject an unquarantined modification (507), then in this example it may be determined whether the election is to finish reviewing modifications (510).

If it is determined that the election is not to finish reviewing modifications (510), then in this example remaining modifications, if any, may be provided (502). If it is determined that the election is to finish reviewing modifications (510), then in this example processing is complete (509).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, by a device including a processor, an accumulated balance value associated with a second profile;
   comparing the accumulated balance value to a threshold;
   in response to the comparing indicating that the accumulated balance value satisfies a function of the threshold, permitting a modification of a first profile from the second profile;
   in response to a determination that the modification has been made to the first profile, subtracting a first amount from the accumulated balance value
   in response to a social network activity associated with the second profile being determined to satisfy a condition, changing the accumulated balance value by a third amount; and
   upon determining the social network activity to be less than a defined level of activity, decreasing the accumulated balance value by the third amount.

2. The method of claim 1, further comprising, in response to a monetary payment associated with the second profile being determined to have been made, increasing the accumulated balance value by a second amount.

3. The method of claim 1, wherein the changing the accumulated balance value comprises increasing the accumulated balance value by the third amount in response to the social network activity being determined to be of at least the defined level of activity.

4. The method of claim 1, further comprising applying the modification to the first profile for a time period corresponding to the first amount.

5. The method of claim 1, wherein the accumulated balance value is based on accumulated points.

6. A system, comprising:
   a processing device; and
   a memory, communicatively coupled to the processing device, having stored therein computer-executable instructions, comprising:
   a modification permission determiner component configured to:
   determine an accumulated balance value associated with a second profile;
   in response to a comparison of the accumulated balance value indicating that the accumulated balance value satisfies a function of a threshold, enable a modification of a first profile from the second profile;
   in response to a determination that the modification to the first profile has been made, decreasing the accumulated balance value by a first amount;
   in response to a social network activity associated with the second profile, increasing or decreasing the accumulated balance value by a third amount;
   wherein the accumulated balance value is decreased by the third amount in response to the social network activity being determined not to be of a predetermined level.

7. The system of claim 6, wherein the modification permission determiner component is further configured to, in response to a monetary payment associated with the second profile being determined to have been made, increase the accumulated balance value by a second amount.

8. The system of claim 6, wherein the accumulated balance value is increased by the third amount in response to the social network activity being determined to be of the predetermined level.

9. The system of claim 6, wherein the modification permission determiner component is further configured to apply the modification to the first profile for a limited time period corresponding to the first amount.

10. A non-transitory computer-readable medium having instructions stored thereon that, in response to execution, cause at least one device including a processor to perform operations, comprising:
   obtaining an accumulated balance value associated with a second profile;
   comparing the accumulated balance value to a threshold;
   in response to the comparing indicating that the accumulated balance value satisfies a function of the threshold, allowing a first profile to be modified from the second profile;
   in response to the first profile being modified by the second profile, subtracting a first amount from the accumulated balance value;
   in response to a social network activity associated with the second profile being determined to have occurred, increasing or decreasing the accumulated balance value by a third amount; and
   wherein the accumulated balance value is decreased by the third amount in response to the social network activity being determined not to be of a defined level.

11. The non-transitory computer-readable medium of claim 10, wherein the operations further comprise, in response to a monetary payment associated with the second profile, increasing the accumulated balance value by a second amount.

12. The tangible non-transitory computer-readable medium of claim 10, wherein the accumulated balance value is increased by the third amount in response to the social network activity being determined to be of the defined level.

13. The non-transitory computer-readable medium of claim 10, wherein the modification is applied to the first profile for a limited time period corresponding to the first amount.

14. The non-transitory computer-readable medium of claim 10, wherein the accumulated balance value is based on an accumulated points system.

15. A system comprising: a processor, the processor comprising:
   means for retrieving an accumulated balance value associated with a second profile;
   means for comparing the accumulated balance value to a threshold;
   means for allowing the second profile to modify a first profile in response to the
   comparing indicating that the accumulated balance value satisfies a function of the threshold;
   means for subtracting a first amount from the accumulated balance value in response to a modification to the first profile being applied from the second profile;
   means for increasing or decreasing the accumulated balance value by a third amount in response to a social network activity associated with the second profile being determined to have occurred; and
   wherein the accumulated balance value is decreased by the third amount in response to the social network activity being determined not to be of a defined level.

16. The system of claim 15, further comprising means for increasing the accumulated balance value by a second amount in response to a monetary payment associated with the second profile being determined to have been made.

17. The system of claim 15, wherein the accumulated balance value is increased by the third amount in response to the social network activity being determined to be of a predetermined level.

18. The system of claim 15, wherein the accumulated balance value is decreased by the third amount in response to the social network activity being determined not to be of the predetermined level.

19. The system of claim 15, further comprising means for applying the modification to the first profile for a limited time period corresponding to the first amount.

* * * * *